United States Patent
Nair et al.

(10) Patent No.: US 12,489,611 B2
(45) Date of Patent: Dec. 2, 2025

(54) SYSTEMS, METHODS, AND APPARATUSES FOR DYNAMIC FOLDING AND COMPRESSION OF DATA USING QUANTUM COMPUTING

(71) Applicant: BANK OF AMERICA CORPORATION, Charlotte, NC (US)

(72) Inventors: Radhika Vinaikrishnan Nair, Maharashtra (IN); Dalydas Karanath, Kerala (IN); Syed Najumudeen, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 265 days.

(21) Appl. No.: 18/142,120

(22) Filed: May 2, 2023

(65) Prior Publication Data
US 2024/0372711 A1    Nov. 7, 2024

(51) Int. Cl.
  *H04L 9/08* (2006.01)
  *G06N 10/20* (2022.01)

(52) U.S. Cl.
  CPC ........... *H04L 9/0852* (2013.01); *G06N 10/20* (2022.01)

(58) Field of Classification Search
  CPC .................................................... H04L 9/0852
  USPC ....................................................... 713/189
  See application file for complete search history.

(56) References Cited

U.S. PATENT DOCUMENTS

| | | | |
|---|---|---|---|
| 5,658,157 A | 8/1997 | Koiwa et al. | |
| 8,897,449 B1 | 11/2014 | Broadbent | |
| 9,569,143 B1 | 2/2017 | Sehgal et al. | |
| 9,639,584 B2 | 5/2017 | Anuj et al. | |
| 9,858,009 B2 | 1/2018 | Bhalerao et al. | |
| 11,070,532 B1 * | 7/2021 | Choi | H04L 63/083 |
| 11,539,528 B2 | 12/2022 | Sloane et al. | |
| 2010/0251049 A1 | 9/2010 | Goto et al. | |
| 2017/0117021 A1 | 4/2017 | Yang et al. | |

FOREIGN PATENT DOCUMENTS

| | | |
|---|---|---|
| EP | 2742644 B1 | 4/2022 |
| WO | 2018011825 A1 | 1/2018 |

OTHER PUBLICATIONS

Date, Prasanna. "Adiabatic Quantum Linear Regression." Cornell University, Aug. 5, 2020, https://arxiv.org/abs/2008.02355.
Cortese, John A. "Loading Classical Data into a Quantum Computer." Lincoln Library, Massachusetts Institute Technology, Lexington, Massachusetts, USA, Mar. 5, 2018, 1803.01958.pdf (arxiv.org).

* cited by examiner

*Primary Examiner* — Anthony D Brown
(74) *Attorney, Agent, or Firm* — Moore & Van Allen PLLC; Nicholas C. Russell

(57) ABSTRACT

Systems, computer program products, and methods are described herein for dynamic folding and compression of data using quantum computing. The present disclosure is configured to determine a list of similarities through a comparison of a dataset with a historical record associated with previous datasets; recreate, in response to the list of similarities of the dataset, the dataset through a process map table; compress the dataset based on similarities found in the historical record; determine a folding type for folding of the compressed dataset; and encrypting the folded and compressed dataset, the dynamic hash table, and the key value data pair through quantum computing utilizing linear compression.

20 Claims, 8 Drawing Sheets

```
                                                           ┌─ 600
┌─────────────────────────────────────────────────────────────────┐
│  ENCRYPTING THE FOLDED AND COMPRESSED DATASET, THE DYNAMIC HASH │
│  TABLE, AND THE KEY VALUE DATA PAIR THROUGH QUANTUM COMPUTING   │
│                 UTILIZING LINEAR COMPRESSION                    │
│                              212                                │
└─────────────────────────────────────────────────────────────────┘
                                  ▼
┌─────────────────────────────────────────────────────────────────┐
│    ELIMINATING VIA A STRUCTURAL REDUNDANT ELIMINATION A POST FOLDED │
│  SET OF REDUNDANT DATA FROM THE FOLDED AND COMPRESSED DATASET, THE │
│          DYNAMIC HASH TABLE, AND THE KEY VALUE PAIR              │
│                              602                                │
└─────────────────────────────────────────────────────────────────┘
                                  ▼
┌─────────────────────────────────────────────────────────────────┐
│   CONVERTING THE FOLDED AND COMPRESSED DATASET, THE DYNAMIC HASH │
│    TABLE, AND THE KEY VALUE DATA PAIR INTO A QUANTUM STATE      │
│                         REPRESENTATION                          │
│                              604                                │
└─────────────────────────────────────────────────────────────────┘
                                  ▼
┌─────────────────────────────────────────────────────────────────┐
│    ENCRYPTING THE QUANTUM STATE REPRESENTATION USING LINEAR     │
│    SIMILARITIES FOUND WITHIN THE QUANTUM STATE REPRESENTATION   │
│                              606                                │
└─────────────────────────────────────────────────────────────────┘
```

FIGURE 6

SYSTEMS, METHODS, AND APPARATUSES FOR DYNAMIC FOLDING AND COMPRESSION OF DATA USING QUANTUM COMPUTING

TECHNOLOGICAL FIELD

Example embodiments of the present disclosure relate to systems, methods, and apparatuses for dynamic folding and compression of data using quantum computing.

BACKGROUND

High frequency trading involving the transfer and transmission of mass amounts of data at high speeds may encounter difficulties associated with transmitting said data. For instance, the data size may reduce the available storage space, the data may not be secured during transmission, and ineffective techniques may be used to compress the data. Thus, there exists a need for a system that can transfer data securely and reduce the size of the transmitted data.

Applicant has identified a number of deficiencies and problems associated with dynamic folding and compression of data using quantum computing. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for systems, methods, and apparatuses for dynamic folding and compression of data using quantum computing.

In one aspect, a system for dynamic folding and compression of data using quantum computing is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to perform the following operations: determine a list of similarities through a comparison between a dataset and a historical record associated with previous datasets, wherein determination of the list of similarities of the dataset comprises assessing the dataset for similarities to the historical record and mapping the dataset to a process map table; recreate, in response to the list of similarities of the dataset, the dataset through the process map table; compress the dataset based on similarities found in the historical record; determine a folding type for folding of the compressed dataset; fold the compressed dataset using the determined folding type, wherein folding the compressed dataset comprises creating a dynamic hash table with a key value data pair associated with the folded and compressed dataset; and encrypt the folded and compressed dataset, the dynamic hash table, and the key value data pair through quantum computing utilizing linear compression.

In some embodiments, the determination of the folding type for compression causes the at least one processing device to perform the following operations: apply a first convolution on the compressed dataset to create a first set of output channels; apply a max pooling function on the first set of output channels to create a first set of max pooled output channels; apply a second convolution on the first set of max pooled output channels to create a second set of output channels; apply a second max pooling function on the second set of output channels to create a second set of max pooled output channels; apply a rectified linear unit (ReLU) activation function on the second set of max pooled output channels to create a folding compatibility output; and apply a soft max function on the folding compatibility output to determine the folding type for the compressed dataset. In some embodiments, the application of the max pooling function comprises reduction of dimensionality of an input through filtration of the input to collect a determined largest amount of data within a channel.

In some embodiments, determination of the list of similarities of the dataset further comprises generative pre-trained transformer framework to assess the historical record for corpora that can be compressed through the process map table.

In some embodiments, recreation of the dataset through the process map table further comprises clustering the dataset and performing a lexical analysis.

In some embodiments, encryption of the folded and compressed dataset, the dynamic hash table, and the key value data pair through quantum computing utilizing linear compression causes the at least one processing device to perform the following operations: eliminate, via a structural redundant elimination, a post folded set of redundant data from the folded and compressed dataset, the dynamic hash table, and the key value data pair; convert the folded and compressed dataset, the dynamic hash table, and the key value data pair into a quantum state representation; and encrypt the quantum state representation using linear similarities found within the quantum state representation.

In some embodiments, the encrypted quantum state representation is transmitted to a predetermined destination.

In some embodiments, wherein an inverse encryption function, an unfolding, and a decompression of the encrypted quantum state representation causes the at least one processing device to perform the following operations: crack the encrypted quantum state representation encryption using the inverse encryption function on the encrypted quantum state representation; obtain the folded and compressed dataset, the dynamic hash table, and the key value data pair from the cracked encrypted quantum state representation; unfold the folded and compressed dataset using the dynamic hash table and the key value data pair; obtain the compressed dataset from the unfolding of the folded and compressed dataset; decompress the compressed dataset; obtain the dataset through the decompression of the compressed dataset.

In another aspect, a computer implemented method for dynamic folding and compression of data using quantum computing is provided. In some embodiments, the computer-implemented method may comprise: determining a list of similarities through a comparison between a dataset and a historical record associated with previous datasets, wherein determination of the list of similarities of the dataset comprises assessing the dataset for similarities to the historical record and mapping the dataset to a process map table; recreating, in response to the list of similarities of the dataset, the dataset through the process map table; compressing the dataset based on similarities found in the historical record; determining a folding type for folding of the compressed dataset; folding the compressed dataset using the determined folding type, wherein folding the compressed dataset comprises creating a dynamic hash table with a key value data pair associated with the folded and compressed dataset; and encrypting the folded and compressed dataset, the dynamic hash table, and the key value data pair through quantum computing utilizing linear compression.

In some embodiments, the computer implemented method further comprises: apply a first convolution on the compressed dataset to create a first set of output channels; applying a max pooling function on the first set of output channels to create a first set of max pooled output channels; applying a second convolution on the first set of max pooled output channel to create a second set of max pooled output channels; applying a second max pooling function on the second set of output channels to create a second set of max pooled output channels; applying a rectified linear unit (ReLU) activation function on the second set of max pooled output channels to create a folding compatibility output; and applying a soft max function on the folding compatibility output to determine the folding type for the compressed dataset. In some embodiments, the application of the max pooling function comprises reduction of dimensionality of an input through filtration of the input to collect a determined largest amount of data within a channel.

In some embodiments, determination of the list of similarities of the dataset further comprises generative pre-trained transformer framework to assess the historical record for corpora that can be compressed through the process map table.

In some embodiments, recreation of the dataset through the process map table further comprises clustering the dataset and performing a lexical analysis.

In some embodiments, the processing device is configured to cause the processor to: eliminate, via a structural redundant elimination, a post folded set of redundant data from the folded and compressed dataset, the dynamic hash table, and the key value data pair; convert the folded and compressed dataset, the dynamic hash table, and the encrypted key value data pair into a quantum state representation; and encrypt the quantum state representation using linear similarities found within the quantum state representation.

In some embodiments, an inverse encryption function, an unfolding, and a decompression of the encrypted quantum state representation causes the processing device to further be configured to cause the processor to perform the following operations: crack the quantum state representation encryption using the inverse encryption function on the encrypted quantum state representation to obtain the folded and compressed dataset, the dynamic hash table, and the key value data pair; unfold the folded and compressed dataset using the dynamic hash table and the key value data pair; obtain the compressed dataset from the unfolding of the folded and compressed dataset; decompress the compressed dataset; and obtain the dataset through decompression of the compressed dataset.

In another aspect, a computer-implemented method for dynamic data folding and compression of data using quantum computing is provided. In some embodiments, the computer-implemented method may comprise: determining a list of similarities through a comparison between a dataset and a historical record associated with previous datasets; wherein determining the list of similarities of the dataset comprises assessing the dataset for similarities to the historical record and mapping the dataset to a process map table; recreating, in response to the list of similarities of the dataset, the dataset through the process map table; compressing the dataset based on similarities found in the historical record; determining a folding type for folding of the compressed dataset; and folding the compressed dataset using the determined folding type, wherein folding the compressed dataset comprises creating a dynamic hash table with a key value data pair associated with the folded and compressed dataset; and encrypting the folded and compressed dataset, the dynamic hash table, and the key value data pair through quantum computing utilizing linear compression.

In some embodiments, the computer implemented method further comprises: applying a first convolution on the compressed dataset to create a first set of output channels; applying a max pooling function on the first set of output channels to create a first set of max pooled output channels; applying a second convolution on the first set of max pooled output channels to create a second set of output channels; applying a second max pooling function on the second set of output channels to create a second set of max pooled output channels; applying a rectified linear unit (ReLU) activation function on the second set of max pooled output channels to create a folding compatibility output; and applying a soft max function on the folding compatibility output to determine the folding type for the dataset.

In some embodiments, the application of the max pooling function comprises reduction of dimensionality of an input through filtration of the input to collect a determined largest amount of data within a channel and eliminate smaller data within the channel.

In some embodiments, encryption of the folded and compressed dataset, the dynamic hash table, and the encrypted key value data pair through quantum computing utilizing linear compression further comprises: eliminating, via a structural redundant elimination, a post folded set of redundant data from the folded and compressed dataset, the dynamic hash table, and the key value data pair; converting the folded and compressed dataset, the dynamic hash table, and the key value data pair into a quantum state representation; and encrypting the quantum state representation using linear similarities found within the quantum state representation.

In some embodiments, an inverse encryption function, an unfolding, and a decompression of the encrypted quantum state representation comprises: cracking the encrypted quantum state representation using the inverse encryption function on the encrypted quantum state representation; obtaining the folded and compressed dataset, the dynamic hash table, and key value data pair from the cracked encrypted quantum state representation; unfolding the folded and compressed dataset using the dynamic hash table and the key value pair; obtaining the compressed dataset from the unfolding of the folded and compressed dataset; decompressing the compressed dataset; and obtaining the dataset through the decompression of the dataset.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
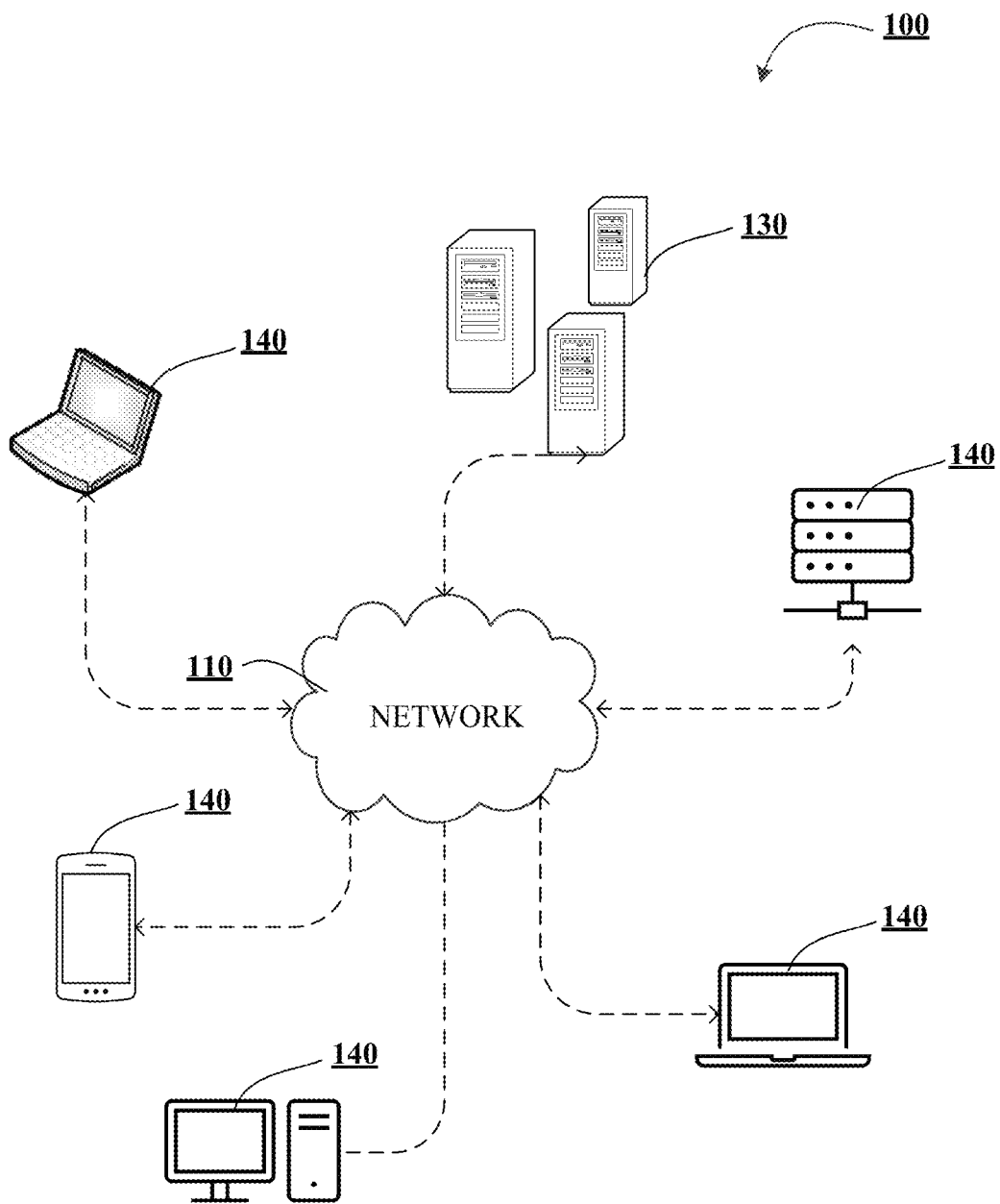
Figure 1B:
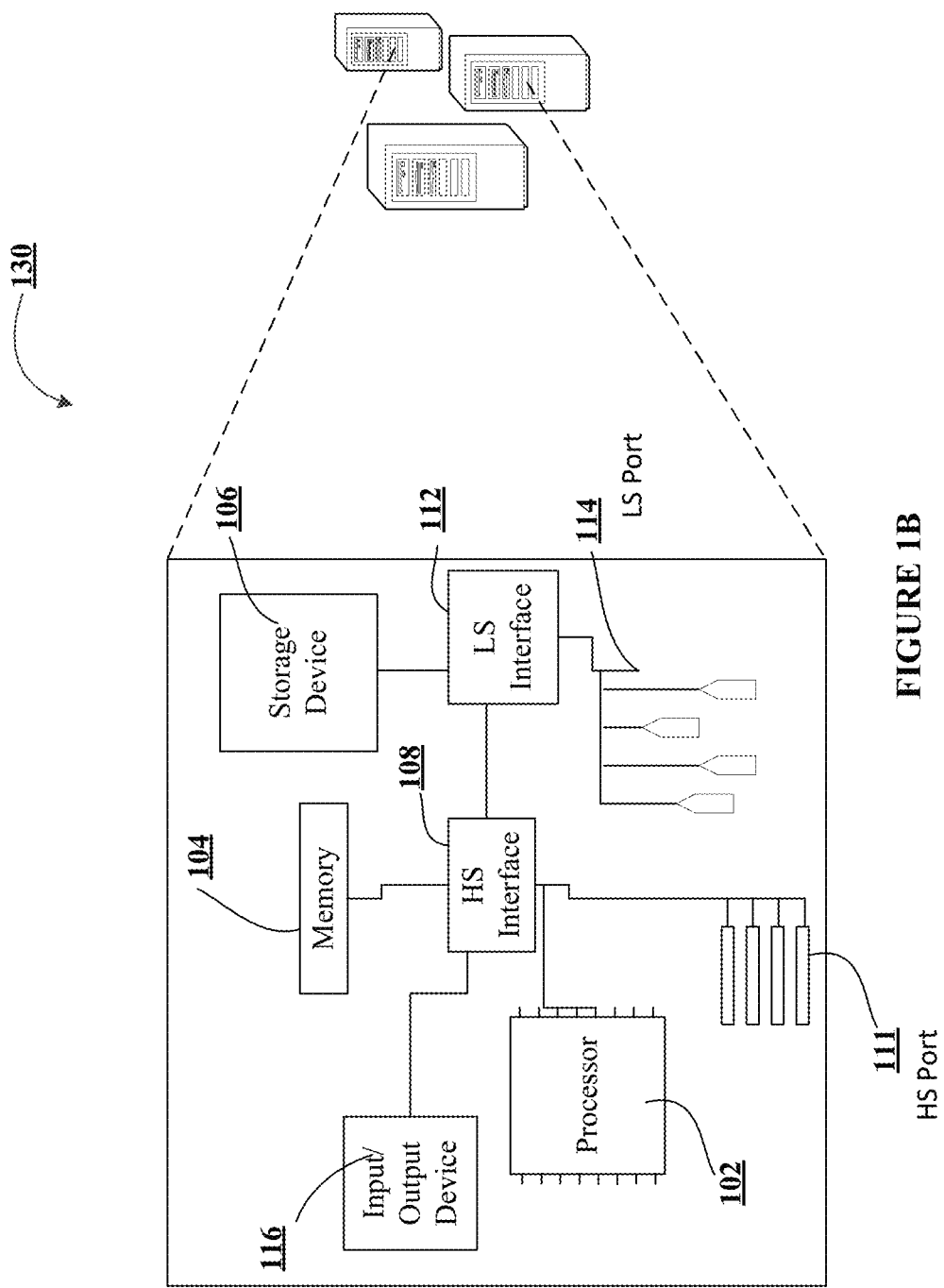
Figure 1C:
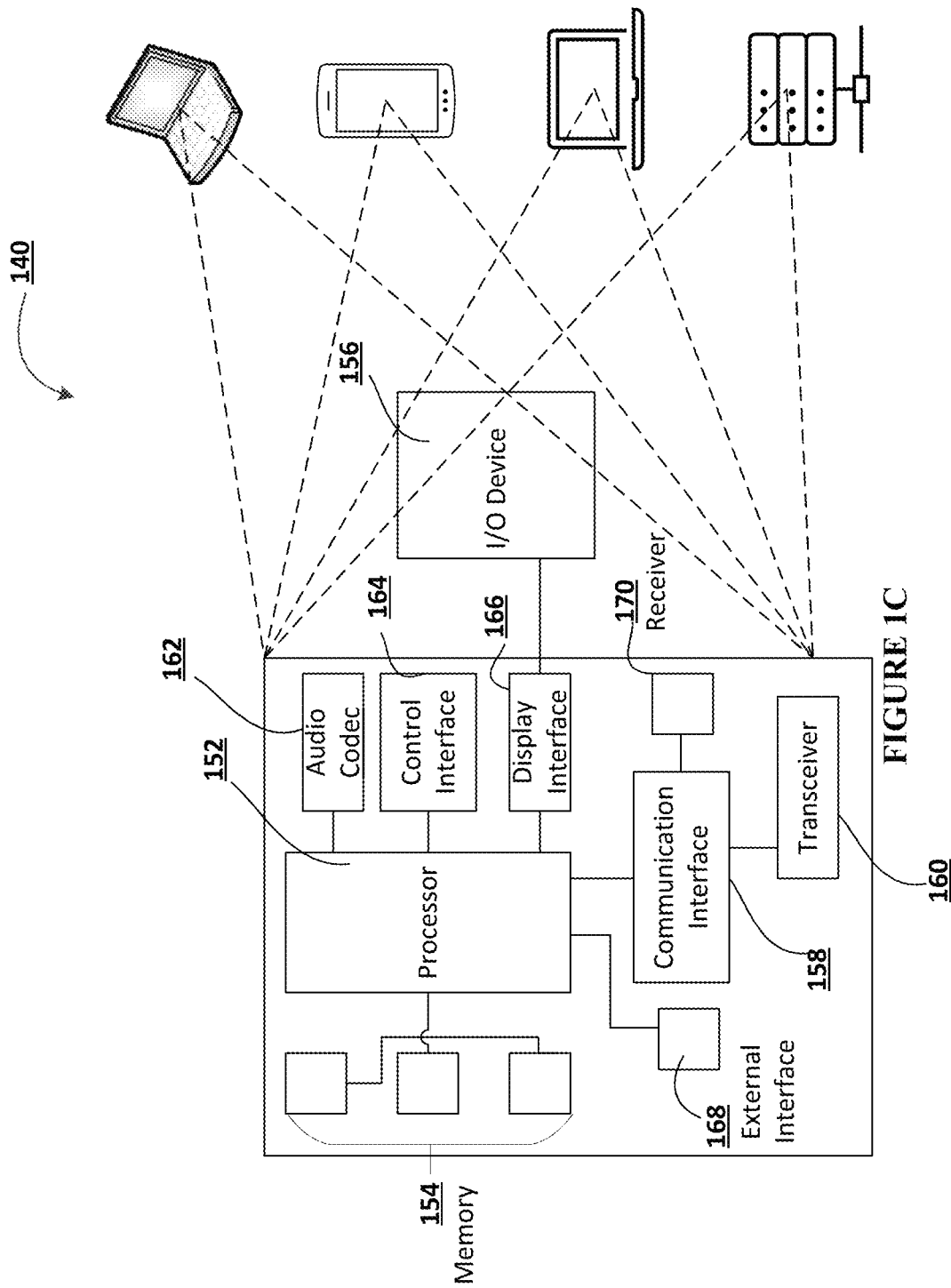
Figure 2:
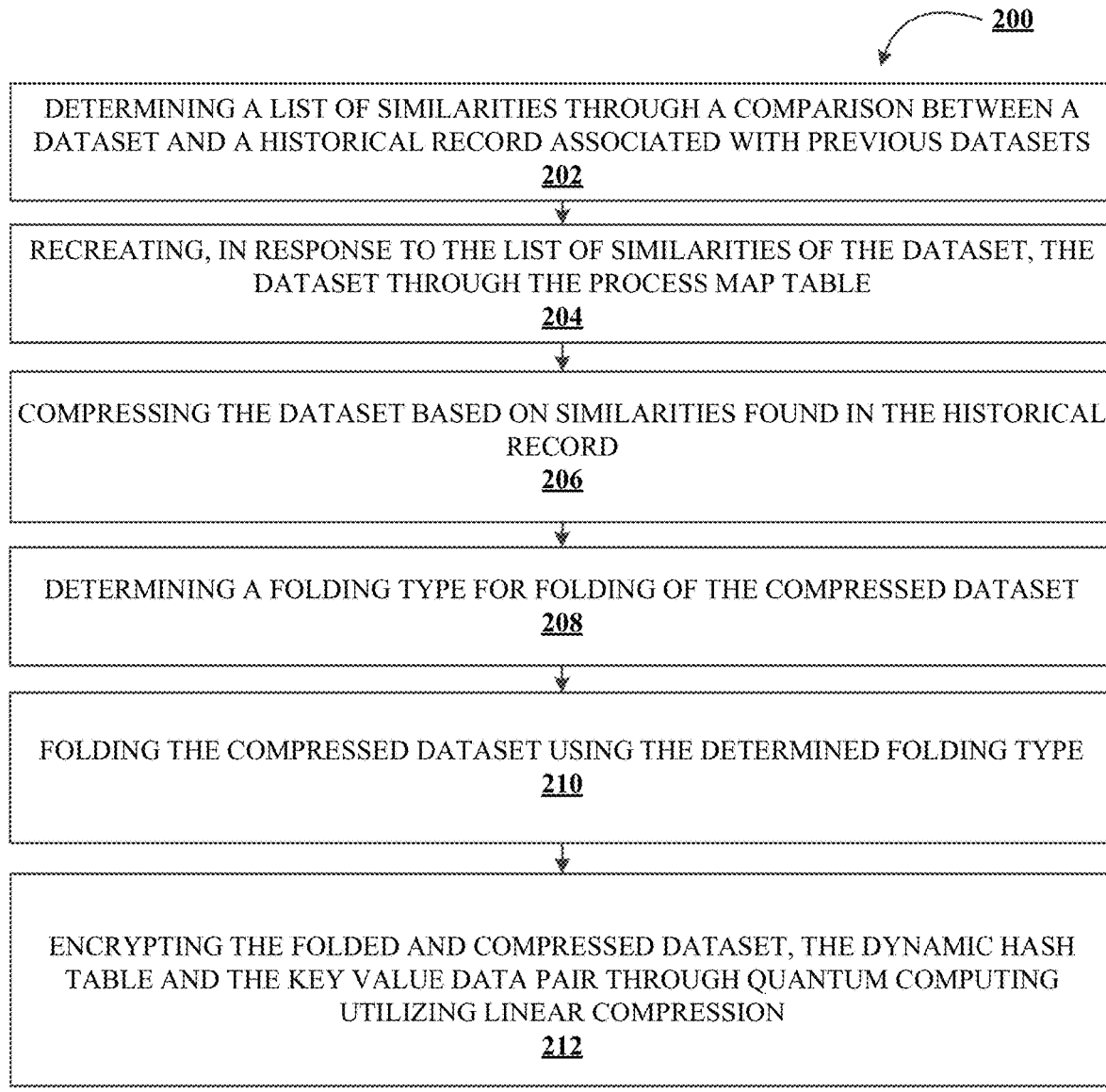
Figure 3:
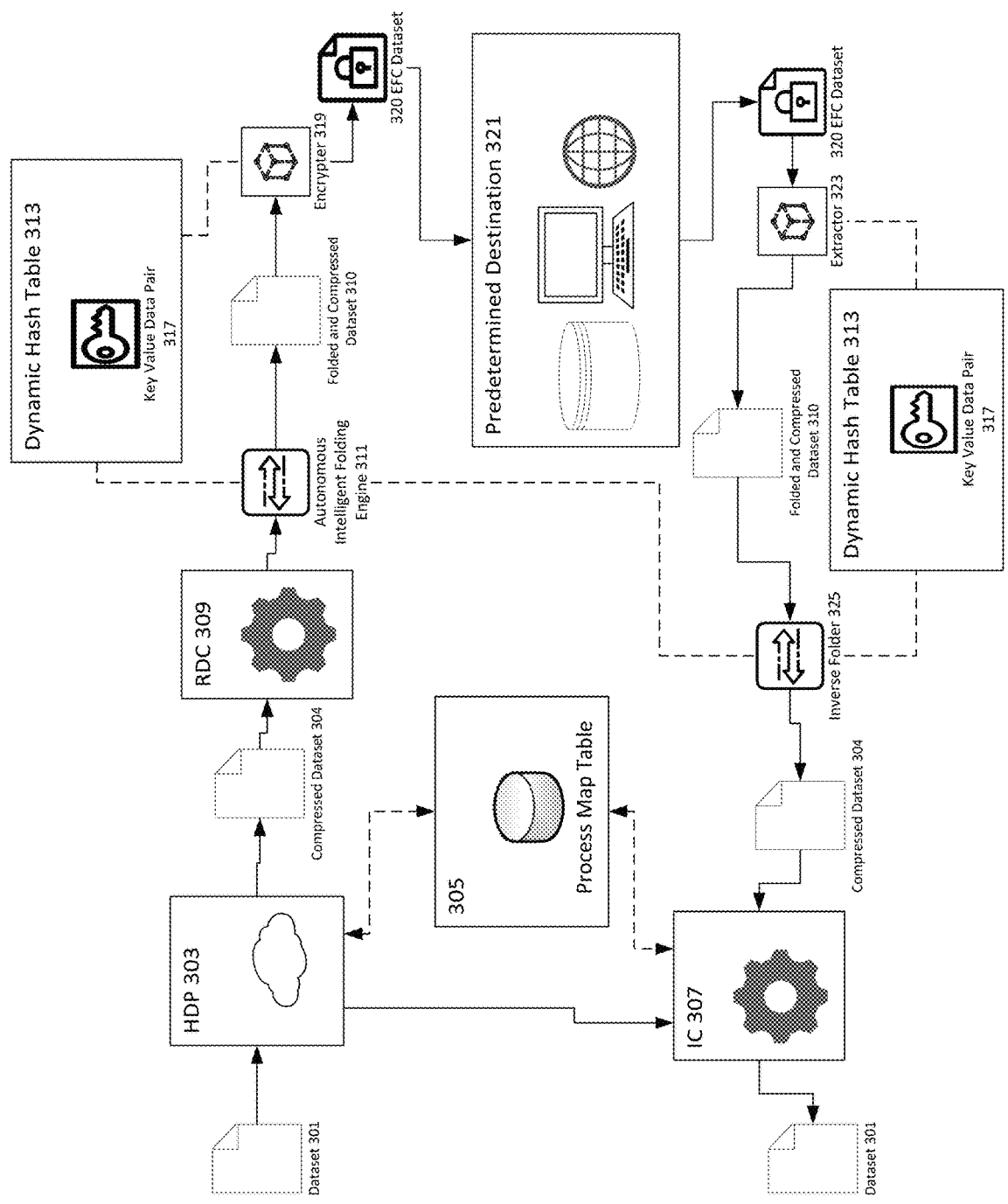
Figure 4:
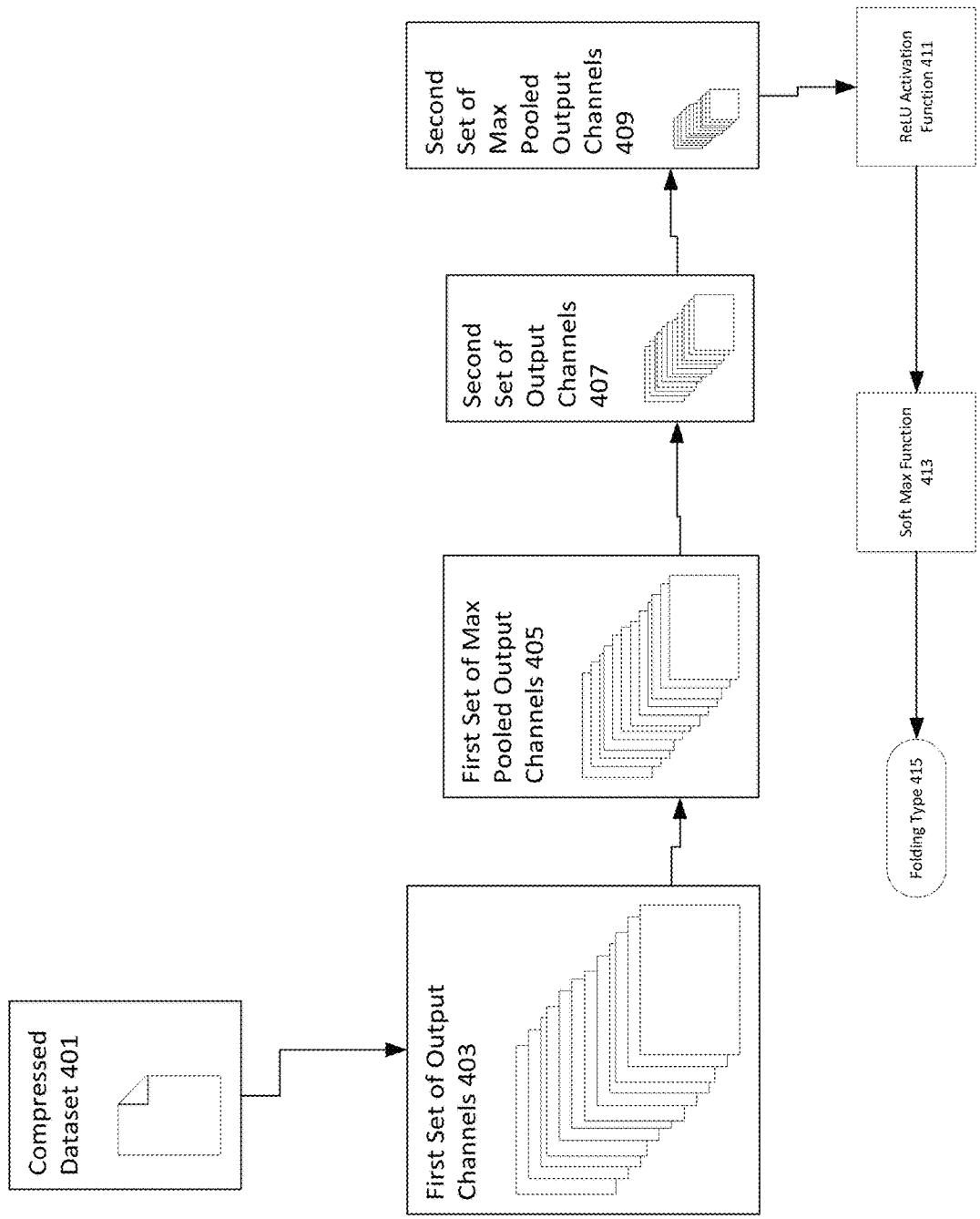
Figure 5:
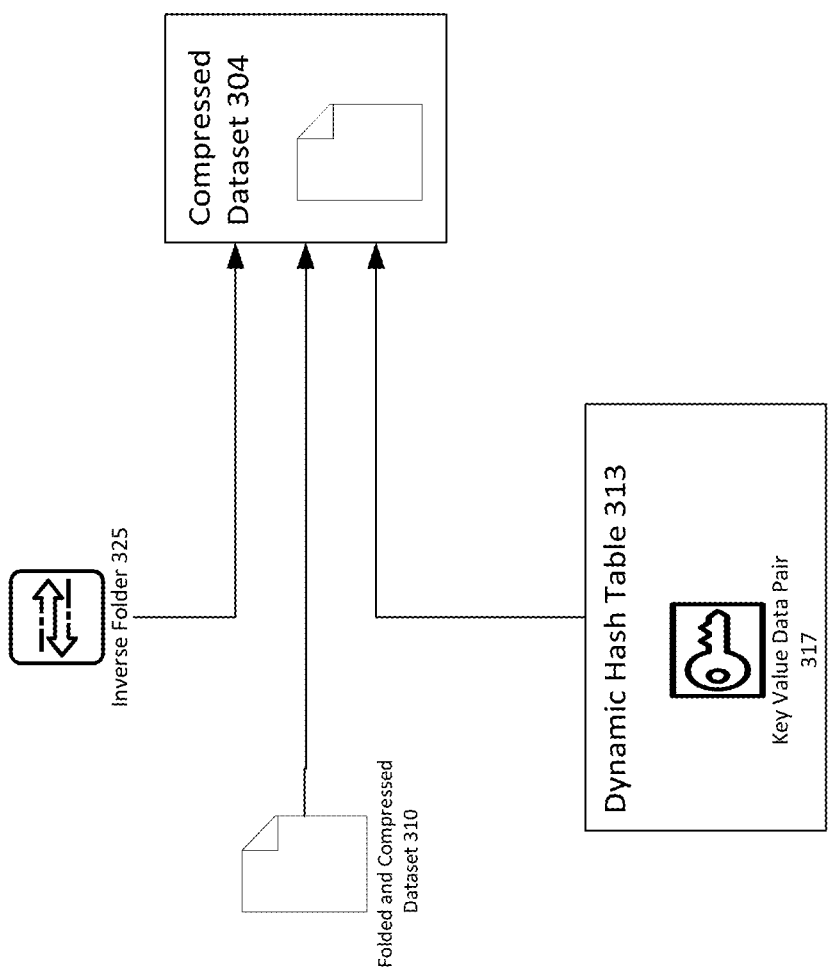

FIGS. 1A-1C illustrates technical components of an exemplary distributed computing environment for dynamic folding and compression of data using quantum computing, in accordance with an embodiment of the disclosure;

FIG. 2 illustrates a process flow for dynamic folding and compression of data using quantum computing, in accordance with an embodiment of the disclosure;

FIG. 3 illustrates an exemplary compression, folding, and encryption architecture, in accordance with an embodiment of the disclosure;

FIG. 4 illustrates a selection process for determination of a folding type, in accordance with an embodiment of the disclosure;

FIG. 5 illustrates an exemplary retrieval of a compressed dataset from a folded and compressed dataset, in accordance with an embodiment of the disclosure; and FIG. 6 illustrates a process flow for encryption through quantum computing utilizing linear compression, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As described in further details herein, the present disclosure provides a solution to the above-referenced problems encountered in data transmission, particularly in high frequency trading, such as ensuring security of transferred data and transferring mass volumes of data at high speeds. Security of the transferred data as well as speed at which the data is transferred may be dependent on the type of compression types and encryption mechanisms employed, which in turn may be dependent on the data that is being transferred. The present disclosure solves the above technical problem by implementing a dynamic folding and compression system leveraging quantum computing to analyze data as received and perform compression, folding, and encryption based on the analysis. In this manner, data that is similar to previously processed data can be compressed, folded, and encrypted based on previous techniques, while new data may be analyzed to determine efficient compression, folding, and encryption techniques as well as an inverse function to recreate or retrieve the transmitted data.

Accordingly, the present disclosure comprises determination of a dataset with a historical record to use past compression, folding types, and encryption tools if similarities are found, compressing a dataset, determining a fold type for the dataset, folding the dataset, and encrypting the dataset using quantum computing. Similarities between the dataset and the historical record enable the dataset to be compressed, folded, and encrypted using tools previously employed for similar datasets. In an instance where no similarities are found, the dataset is compressed and analyzed to determine a fold type, folded using the determined fold type, encrypted through conversion into a quantum state, and subsequently compressed using linear similarities. An inverse function may be employed to decompress, unfold, and crack the encryption employed during the transfer process to retrieve or recreate the dataset. In some embodiments, compression of the dataset may use generative pre-trained transformer framework to utilize compression opportunities. In some embodiments, determination of the fold type may use a series of convolutions, max-pooling functions, a rectified linear unit activation function, and/or a soft max function to determine a fold type.

What is more, the present disclosure provides a technical solution to a technical problem. As described herein, the technical problem includes the transfer of mass volumes of data securely transferred at high speeds. The technical solution presented herein allows for dynamic compression and secure encryption based on the data being transferred. In particular, dynamic folding and compression of data using quantum computing is an improvement over existing solutions for the secure transfer of mass data at high speeds, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for systems, methods, and apparatuses for dynamic folding and compression of data using quantum computing 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location—related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for dynamic folding and compression of data using quantum computing, in accordance with an embodiment of the disclosure. In some embodiments, a dynamic folding and compression system (e.g., similar to one or more of the systems described herein with respect to FIGS. 1A-1C, 3, 4, and 5) may perform one or more of the steps of process flow 200. For example, the determination of the fold type used (e.g., the process of FIG. 4 described herein with respect to FIG. 1A-1C) may perform the steps of process flow 200.

As shown in block 202, the process flow 200 may include the step of determining a list of similarities through a comparison between a dataset and a historical record associated with previous datasets. In some embodiments, the historical record associated with previous datasets may comprise previous datasets and compression mechanisms used to compress previously processed datasets. In some embodiments, the historical record, and its previous datasets, may be compared with a dataset input to determine at least one compression mechanism to compress the dataset input. For instance, a current file (e.g., a first file) in which a list of similarities are determined may be compared to a previously processed file of the historical record (e.g., a second file), whereby the previously processed file comprises the same structure and/or format of the current file. The system may then utilize the compression mechanisms used to compress the previously processed file to compress the current file. In other words, the compression mechanisms used to compress the second file/past file may be used to compress the first file/current file.

In some embodiments, the comparison of the dataset may further comprise data cleansing through predetermined validation rules, validation constraints, and/or check routines—which may check for correctness, meaningfulness, and/or security concerns relating to the dataset and the potential transmission of the dataset. In some embodiments, comparison of the dataset with the historical record may be accomplished through machine learning (e.g., a file may be run through a generative pre-trained transformer (GPT) framework to find similarities between the file and the historical record, as well as compression mechanisms used for similar datasets). In some embodiments, the historical record may also be expanded and/or updated as datasets are compared. For instance, a file undergoing comparison with the historical record may be added to the historical record after comparison, along with the associated compression mechanisms used to compress the file.

In various embodiments, determination of the similarities of the dataset comprises assessing the dataset for similarities to the historical record and mapping the dataset to a process map table. The process map table may record, track, and/or otherwise document the dataset input. Records of the dataset input and the compression, folding, and encryption mechanisms used may be recorded both to expand the historical record and to provide instructions on possible decompression, unfolding, and/or cracking the encryption of the dataset after transmission. For example, a file input may be compressed using a lossless text compression algorithm, the algorithm used would be noted in the historical record for future dataset compressions and the algorithm would be in the process map table to provide instructions on decompression.

In various embodiments, the process map table may be used in conjunction with the list of similarities to find compression mechanisms, folding types, and encryption employed for similar datasets that may be employed on the dataset input. In other words, previously utilized techniques may be employed in the dataset input if the dataset input is deemed to be similar to a previous dataset, and/or the previous compression, folding, and encryption techniques are determined to be effective on the dataset input. Determination of the effectiveness of previous compression, folding, and encryption techniques may be based on the similarity of the dataset input to the historical record. The implementation of previous compression, folding, and encryption techniques may enable the dataset to be compressed, folded, and encrypted without undertaking a new analysis process to determine compression mechanisms, folding type, and encryption implementations described in further detail below.

As shown in block 204, the process flow 200 may include the step of recreating the dataset through the process map table in response to the list of similarities of the dataset. If similarities to the historical record are found within the dataset input, a delta of the current (a record of the similarities found in the dataset to the historical record) may be transmitted to enable the recreation of the dataset. The delta of the current may show the similarities between the dataset and the historical record which may enable the process table to recreate the dataset in various forms of compression, folding, and encryption. The process map table may be used to bypass or skip parts of the folding, compressing, and encrypting process by recreating the dataset.

In some embodiments, the dataset may be recreated through the process map table in stages of encryption, folding, and compression equivalent to the stage of encryption, folding, and compression found from similarities within the historical record. For instance, if the delta of the current indicates the dataset may be folded and compressed using previous techniques, the dataset may be recreated as a folded and compressed dataset, which may then undergo encryption as described in greater detail below. In other words, the process map table may recreate the dataset dependent on the delta of the current. The dataset may be recreated by the process table to bypass stages of compression, folding, and encryption in which the tools and/or mechanisms used to achieve each process may be bypassed. For example, in an instance in which the folding type from a similar dataset found in the historical record may be used on a dataset input, the process of determining the folding type for the dataset input can be bypassed and the dataset may be recreated in a post folded form.

In some embodiments, similarities found within the historical record to the dataset may enable the compression, folding, and encryption of the dataset without further analysis on how compression, folding, and encryption of the dataset may be carried out. For instance, if the similarities found in a dataset input match the similarities found from a dataset within the historical record, the compression techniques, folding type, and encryption can be used without analyzing the dataset. The dataset may then be transmitted to a predetermined destination after undergoing the compression, folding, and encryption techniques recorded in the process map table.

In some embodiments, the predetermined destination may comprise at least one destination in which the dataset may be transmitted. The predetermined destination may comprise a database, a secure connection, an internet of things (IoT) device, a trade desk, or institution capable of receiving the dataset after compression, folding, and encryption. The predetermined destination may have the capability of at least receiving the dataset after transmission, and may store, save, and/or transfer the encrypted, folded, and compressed dataset a destination capable of using an inverse process to crack the encryption, unfold, and decompress the encrypted, folded, and compressed dataset. The predetermined destination may be determined by the system, a client of the system, a manager of the system.

In some embodiments, the compression, folding type, and encryption techniques used on the dataset (whether the dataset was found to be similar to a dataset within the historical record or not) may be recorded in the process map table, as well as being added to the historical record. The historical record is thus expanded and/or updated, and may increase the likelihood of finding similarities, as well as compression techniques that may be used for future datasets. Thus, and in some embodiments, the historical record's expansion and dynamic updating may be used by the system to streamline the process of compression, folding, and encryption of future datasets, without undue hardship on processing components and resources required to implement the solution described herein.

As shown in block 206, the process flow 200 may include the step of compressing the dataset based on similarities found in the historical record. The dataset may be compressed using the compression techniques found in the comparison of the dataset with the historical record. In an instance where the comparison of the dataset with the historical record does not yield compression techniques, or the compression techniques employed do not compress the dataset by a predetermined percent or amount, further compression may be employed. Further compression of the dataset, and the techniques, mechanisms, algorithms, and procedures in which compression may further be performed may be determined and employed through a unified evaluation of the dataset. A unified evaluation of the dataset may be conducted to determine the type and/or amount of data compression performed on the dataset. The unified evaluation may comprise further compressing the dataset, transducing the dataset, and/or the use of a form of a GPT framework word processor. The unified evaluation in which the dataset may be subjected to may use compression techniques, algorithms, comparisons, and/or transductions in combinations to compress the dataset. In other words, any previous techniques used on similar datasets from the historical record are employed, and further compression may be determined and performed through a unified evaluation.

In some embodiments, compression of the dataset through the unified evaluation may comprise clustering the dataset and/or performing a lexical analysis. Clustering of the dataset may comprise the use of algorithms to group or cluster data within the dataset that may be similar to other similar pieces of data within the dataset. For instance, clustering may be performed based on size, type, and/or similar characteristics of data within the dataset. Lexical analysis of the dataset may comprise converting a sequence of characters, and compression of similarities and stop words within the dataset. For instance, stop words may be selected such as "the", "of" or "and" may be removed and/or replaced within the dataset.

In various embodiments, compression of the dataset may be done through lossless or lossy compression algorithms, such as lossless text compression, lossless image compression, lossless bit compression, and/or lossy compression depending on the similarities found in the historical record and the dataset input. For instance, if a specific lossless text algorithm was found to compress a similar dataset (similar to the dataset input), the lossless algorithm may be used to compress the dataset input (e.g., a phrase or sentence within the dataset such as "pending" may be replaced every time it appears in the dataset with a single character such as "p").

In some embodiments, compression of the dataset may utilize summarization of the dataset, data-to-text compression and/or image captioning to reduce the size of the dataset input. In various embodiments, compression of the dataset may comprise transduction of the dataset, wherein a conclusion regarding the dataset may be conducted such as a translation, style transfer, and/or paraphrasing of the dataset. For instance, if a dataset has text written in Mandarin, the text may be translated into English which may compress the number of characters within the dataset.

Compression of the dataset may be performed based on techniques employed from the historical record and/or the unified evaluation dependent on the dataset. For instance, if a dataset is compressed using previous techniques from comparison of the historical record, the unified evaluation may not be employed. In other instances, a dataset may not have similarities with any of the previous datasets stored within the historical record and may instead be compressed using the unified evaluation. In other instances, the dataset may be partially compressed through previous techniques performed within the historical record, and attempt to be compressed further through the unified evaluation.

As shown in block 208, the process flow 200 may include the step of determining a folding type for folding of the compressed dataset. Determination of the folding type of the compressed dataset may be determined through evaluation of the compressed dataset through a predetermined set of factors which may be associated with a folding type to which the compressed dataset may be paired with. The evaluation of the compressed dataset and pairing a folding type to the compressed dataset may be based off a folding compatibility output, which may measure the viability of a given fold type against the compressed dataset. In other words, predetermined factors are used to measure and/or compare which fold type may be used for a compressed dataset input. For instance, after evaluating the compressed dataset a vertical half fold may be determined to be more effective at folding the compressed dataset than other folding types. In this instance, a vertical half fold may be chosen as a vertical half fold because it may reduce the size of the compressed dataset by the greatest amount when compared to other fold types. Folding types that may be used include but are not limited to vertical half folds, 3-panel gate folds, French folds, half folds, z-folds, 4-panel accordion folds, double gate folds, roll folds, double parallel folds, and/or map folds. Determination of the folding type, as well as the folding compatibility output, is described in greater detail later in the disclosure.

As shown in block 210, the process flow may include the step of folding the compressed dataset using the determined folding type. In some embodiments, folding of the compressed dataset may comprise creation of a dynamic hash table with a key value data pair associated with the folded and compressed dataset. For instance, if a compressed dataset is folded using a French fold, the data may be folded in half horizontally, then folded vertically in equal sizes. The dynamic hash table and key value data pair may then be created based on the French fold used to fold the compressed dataset. The dynamic hash table may map the compressed data based on the French fold used and assign a key value data pair accordingly. In some embodiments, the key value pair comprised within the dynamic hash table may be used in conjunction with the fold type to unfold the folded and compressed dataset. Attempts to recreate/restore the compressed dataset from the folded and compressed dataset without using the key value pair, dynamic hash table, and fold type may not result in the original compressed dataset. Therefore, as described herein, the use of the key value pair, dynamic hash table, and fold type may allow for higher security in the transmission of compressed datasets.

As shown in block 212, the process flow may include the step of encrypting the folded and compressed dataset, the dynamic hash table, and the key value data pair through quantum computing utilizing linear compression. In some embodiments, the folded and compressed dataset may undergo the encryption process, while the dynamic hash table and the key value data pair may undergo a separate encryption process. For example, the folded and compressed dataset may be encrypted while the dynamic hash table and key value data pair may be encrypted through a separate process. In another example, the folded and compressed dataset may be encrypted along with the key value data pair, without the dynamic hash table. Encryption of the folded and compressed dataset, the dynamic hash table, and the key value data pair may comprise conversion of the folded and compressed dataset, the dynamic hash table, and the key value pair into a quantum state representation, wherein linear compression and structural redundant elimination may be employed for enhanced encryption. In some embodiments, the structural redundant elimination may eliminate post folded redundant data which may (while in the quantum state) be used in linear compression to further enhance compression and encryption of the folded and compressed dataset.

By way of non-limiting example, structural redundant elimination may eliminate repetitive or unnecessary structures within the folded and compressed dataset, the dynamic hash table, and the key value data pair. For instance, the folded and compressed dataset as well as the key value data pair may have repetitive sequences or characters that may be removed without compromising their structural integrity. Structural redundant elimination may further compress and/or reduce the amount of data contained within the folded and compressed dataset. In some embodiments, and upon structural redundant elimination, the folded and compressed dataset may be converted into a quantum state representation.

In some embodiments, conversion of the folded and compressed dataset into the quantum state representation may enable the folded and compressed dataset to be represented through complex numbers. By way of non-limiting example, with representation as complex numbers, algebraic operations may be performed on the quantum state representations for further compression and encryption. The algebraic operations may enable linear similarities to be found within the quantum state representation and may be reduced further through linear compression.

FIG. 3 illustrates an exemplary compression, folding, and encryption architecture 300, in accordance with an embodiment of the invention. The exemplary compression, folding, and encryption architecture may be comprised of a dataset 301; a hybrid data processor (HDP) 303 to compress the dataset into the compressed dataset 304; a process map table 305; an inverse controller (IC) 307; a reinforced decision controller (RDC) 309; an autonomous intelligent folding engine (AIFE) 311 to fold the compressed dataset and create the folded and compressed dataset 310; an encrypter 319 to encrypt the folded and compressed dataset to create an encrypted, folded, and compressed (EFC) dataset 320; and a predetermined destination 321. The exemplary compression, folding, and encryption architecture 300 may further comprise inverse functions to retrieve and/or recreate the dataset 301 post transmission to the predetermined destination 321. In some embodiments, the inverse functions to retrieve the dataset 301 may include an IC 307 to decompress the compressed dataset 304, an inverse folder 325 to unfold the folded and compressed dataset 310 with the key value data pair 317, and an extractor 323 to extract the folded and compressed dataset and key value data pair from the EFC dataset 320 (and/or crack the encryption of the EFC dataset 320).

In some embodiments, the dataset 301 may comprise data that may be transmitted, compressed, folded, and/or encrypted through a network. The dataset may further comprise (singularly or a combination of) text, image, audio, and/or video files. In some embodiments, compression, folding, and encryption of the dataset may be dependent on the specific form or forms of data of which the dataset comprises, and may be determined through the exemplary compression, folding, and encryption architecture 300.

In some embodiments, the HDP 303 may receive the dataset 301 as an input and create a list of similarities through comparison of the dataset with a historical record associated with previous datasets that may have previously been processed through the exemplary compression, folding, and encryption architecture 300. For instance, the HDP 303 may compress the dataset 301 through compression techniques used in similar datasets within the historical record. In some embodiments, the HDP 303 may utilize GPT framework (such as GPT 3 or GPT 4) to check for any widely used corpus and/or corpora that may be compressed within the dataset 301. The GPT framework may be used to find, scan for, check, or otherwise search for corpus/corpora that may be compressible or has been compressed within the historical record. As used herein, the GPT framework may be an open-source artificial intelligence that may be used to aid in the compression of the dataset 301. In some embodiments, the GPT framework may suggest potential compression tools, compression mechanisms, or the like to aid in the compression of the dataset 301. In some embodiments, the HDP 303 may further map the dataset 301 against the process map table 305 to compress the dataset further. The dataset, as well as the compression mechanisms, tools, algorithms, and/or ways in which the dataset may be compressed may be recorded within the process map table 305.

As used herein, corpora may refer to a plurality of text within the dataset 301 which may be repeatedly used, which may have the potential to be compressed. For instance, if corpora found in dataset comprises repeated terms, phrases, and/or the like (such as a repeated "sell limit order" as an example), the corpora may be compressed through replacement (such as with an abbreviation of "SLO") and/or other replacements which may use less data space. As used herein, corpus refers to the singular form of corpora, which may also be compressed within the dataset 301. For instance, singular text and/or words within the dataset may be compressed, such as "transaction" being replaced with "T" to use less data space.

In some embodiments, the HDP 303 may be able to provide datasets within the historical record that have a measurement of similarities between the dataset 301 and a dataset within the historical record. For instance, the HDP 303 may find a text file that is determined to be comprised of 90% of the same material as the dataset 301. The compression tools used to compress the text file within the historical record may be used to compress the dataset 301. In some embodiments, the HDP 303 may compile a list of similar documents and be able to match compression tools previously used to parts of the dataset 301. For instance, a dataset 301 input may be comprised of a text file and image file. The HDP 303 may find two separate files within the historical record that match the text file and image file within the dataset 301. The compression tools used to compress each file individually may be used on separate parts of the dataset 301. Additionally, the compression tools used to compress the dataset 301 by the HDP 303 may be recorded by the process map table 305.

The process map table 305 may be used to record the compression tools and procedures conducted by the HDP 303 and may be used to recreate the dataset 301 through the IC 307. In some embodiments, the process map table 305 may be used to record similarities of the dataset 301 to the historical record found within the HDP 303 and the compression tools used therein. The process map table 305 may further record any compressions conducted through clustering and the lexical analysis within the HDP 303. In further embodiments, the process map table 305 may record the differences found between the historical record within the HDP 303 and the dataset 301.

Upon processing and compression of the dataset 301 by the HDP 303, a resulting compressed dataset 304 may be transferred to the RDC 309. The RDC 309 may determine the folding type or folding mechanism used to fold the compressed dataset 304. The folding type may be selected based on the efficiency and effectiveness of the folding type associated with a specific compressed dataset 304. The folding type may further be determined through the RDC framework, wherein convolutions, max pooling, a rectified linear unit (ReLU) activation function, and a soft max function may be used to determine the folding type. Selection of the folding type used for folding of the compressed dataset 304 may be dynamically selected from a predetermined list of folding types and may be explained in further detail in FIG. 4.

After evaluation of the compressed dataset 304 by the RDC 309, the compressed dataset and the determined folding type may be transmitted to the AIFE 311. The AIFE 311 may receive the determined folding type and fold the compressed dataset 304 using the determined folding type. Folding of the compressed dataset 304 may create a key value data pair 317 which can be used to unfold the compressed dataset. For instance, if the RDC 309 determines that the folding type for a compressed dataset 304 is a vertical half fold, the compressed dataset will be folded using the vertical half fold. The dataset may be unfolded using the key value data pair 317 associated with the vertical half fold. In some embodiments, the folding of the compressed dataset 304 by the AIFE 311 may further comprise the creation of a dynamic hash table 313 with a key value data pair 317 through hashing of the folded and compressed dataset 310. Hashing of the folded and compressed dataset 304 may create a key value, which can be used as a hash lookup to retrieve and/or recreate the folded and compressed dataset. The key value created from the hashing procedure as well as the key value created from the folding type may comprise the key value data pair 317. The folded and compressed dataset 310 and accompanying dynamic hash table 313 may be used to crack or unfold the folded and compressed dataset to recreate and/or retrieve the compressed dataset 304. Upon completion of hashing and folding of the compressed dataset 304, the folded and compressed dataset 310 may be transferred to the encrypter 319.

In some embodiments, hashing of a dataset may refer to passing a dataset through a formula that produces a result, known as a hash. Any changes to the dataset input may result in changes to the hash, as the formula may produce different results. For instance, the entry of "buy" versus the entry of "Buy" as a dataset input may result in two different hashes, as the change in character changes the values used during calculation of the hash. In other embodiments, the fold type used by the AIFE 311 may be used in the hashing process to change the resulting hash. For instance, the fold type used may assign a value, character, or other alteration to the hash input based on the specific fold type. The addition to the hash input based on the fold type changes the resulting hash. To recreate the dataset input post hashing, the key value data pair 317 may be used as an input in a formula to recreate the original dataset. In some embodiments, the AIFE 311 may utilize a salting technique in addition to the dynamic hash used. Salting of the dynamic hash may comprise adding a known value or piece of data to the dynamic hash input. For example, a string such as the word "test" may be added to a dataset input before entering the dynamic hashing process. The added string changes the resulting hash, as any change of input to a hash may alter the results produced from the formula used in the formation of the hash.

The encrypter 319 may encrypt and further compress the folded and compressed dataset 310 as well as the dynamic hash table 313 and key value data pair 317 (which may be referred to as the input to the encrypter 319) through a plurality of encryption and compression techniques. Structural reduction elimination, as described previously, may be employed by the encrypter 319 to compress the input to the encrypter 319 where patterns, repetitions, and other redundant pieces may be replaced and/or eliminated. The input to the encrypter 319 may be subjected to a form of encryption within the encrypter, whereby the type of encryption used may be symmetric or asymmetric encryption. In some embodiments, the encrypter 319 may encrypt the folded and compressed dataset 310 using quantum computing wherein the input to the encrypter 319 is then converted into a quantum state representation. In the quantum state representation, the folded and compressed dataset 310, the dynamic hash table 313, and the key value data pair 317 may be converted into qubits, which in turn may be used in further calculations for further compression. The quantum state representation may be used in the implementation of algebraic operations such as linear compression. Linear compression used in the quantum state may comprise the summation of dependent variables resulting from linear similarities found in qubits.

The encrypter 319 may further encrypt the dynamic hash table 313 and/or the associated key value data pair 317 through conversion into a quantum state representation. In some embodiments, encryption of the dynamic hash table may occur simultaneously or asynchronously to the encryption of the folded and compressed dataset 310. Encryption of the dynamic hash table 313 may also include the use of structural redundant elimination and linear compression. Encryption of the dynamic hash table 313, the associated key value data pair 317, and the folded and compressed dataset 310 may be referred to collectively as the encrypted, folded and compressed (EFC) dataset 320. The EFC dataset may be able to be transmitted to a predetermined destination 321.

The predetermined destination 321 may comprise destinations in which the EFC dataset 320 may be transmitted and/or stored, such as a database, a secure connection, an internet of things (IoT) device, a trade desk, or institution capable of receiving the EFC dataset. The EFC dataset 320 may be received by a predetermined destination 321 which may be capable of at least partially retrieving or recreating the dataset 301 using the EFC dataset. Upon reception of the EFC dataset 320, the dataset 301 may be retrieved or recreated using inverse functions comprised of an extractor 323, an inverse folder 325, and/or an IC 307.

An extractor 323 may first be used to recreate and/or retrieve the folded and compressed dataset 310 using the EFC dataset 320. The extractor 323 may be able to crack the encryption used to create the EFC dataset 320 depending on the type of encryption used in the encrypter 319. The extractor 323 may be used as an inverse process to the encrypter 319, in that it may crack or extract the folded and compressed dataset 310 from the encryption process employed by the encrypter 319. The inverse encryption process performed by the extractor 323 may enable the retrieval, recreation, or cracking of the encryption used to convert the folded and compressed dataset 310, the dynamic hash table 313, and the key value data pair 317 from the EFC dataset 320. In other words, the extractor 323 may enable the original input into the encrypter 319 to be obtained, recreated, and/or retrieved through the output of the encrypter. In some embodiments, the extractor 323 may be used in conjunction with the process map table 305 to use the inverse encryption process employed by the encrypter 319.

After the folded and compressed dataset 310, as well as the dynamic hash table 313 and the key value data pair 317, have been retrieved or recreated from the extractor 323, the folded and compressed dataset as well as the key value data pair may be transferred to the inverse folder 325.

The inverse folder 325 may use the key value data pair 317 and the folding type to retrieve the compressed dataset 304 from the folded and compressed dataset 310. The key value data pair 317 and the dynamic hash table 313 may enable the retrieval or recreation of the compressed dataset 304 through a key value used to both reverse the hashing process and reverse the folding process conducted in the AIFE 311. Use of the key value data pair 317 may further comprise unfolding the folded and compressed dataset 310 and transferring the resulting compressed dataset 304 to the IC 307.

The IC 307 may receive the compressed dataset 304 and/or the similarities found between the dataset 301 and the historical record found within the HDP 303. The IC 307 may use the decompression tools described in the process map table 305 to decompress the compressed dataset 304 and retrieve the dataset 301. For instance, the IC 307 may receive a compressed dataset 304 from the inverse folder 325 and use the information and tools described in the process map table 305 to decompress the compressed dataset and retrieve the dataset 301. In other embodiments, the IC 307 may be able to recreate the dataset 301 using the information provided from the process map table 305.

It will be understood that the embodiment of the compression, folding, and encryption architecture 300 illustrated in FIG. 3 is exemplary and that other embodiments may vary. As another example, in some embodiments, the compression, folding, and encryption architecture 300 may include more, fewer, or different components.

FIG. 4 illustrates a selection process for determination of a folding type in accordance with an embodiment of the invention. In some embodiments, selection of the folding type 415 may be performed on a compressed dataset 304 (as seen in FIG. 3). For example, the compressed dataset 304 may have the folding type determined and selected after being transferred from the HDP 303 to the RDC 309. The exemplary compression, folding, and encryption architecture 300 may perform the steps of determining a folding type.

In some embodiments, the system may comprise a convolutional neural network (CNN)—which may be a deep learning artificial neural network—that is configured to analyze data, particularly images. The CNN may be used to analyze the compressed dataset 401 for various pieces of data within the compressed dataset. The CNN may be comprised of convolutional layers, which receive a plurality of inputs referred to as input channels (such as the compressed dataset 401), perform a convolutional operation or convolution, and then create an output referred to as output channels. The convolutional operation may comprise the use of cross-correlations, sliding dot product, and/or sliding inner-product to measure similarity of two series as a function of the displacement of one relative to the other. The CNN may be able to detect patterns in a dataset, such as edges, shapes, textures, curves, objects, and/or colors. A convolutional layer may comprise a predetermined number of filters, which may be used to detect patterns within input channels. The convolution operation may further comprise convolving the input channels to create the output channels.

In some embodiments, a convolution operation may be performed preceding and/or following a max pooling function.

As used herein, a max pooling function may be performed on the output channels of a convolution operation. In some embodiments, the max pooling function may reduce the dimensionality of the output channels created from the convolution operation by reducing the amount of data in the output channels from the previous convolutional layer. For instance, a compressed dataset after undergoing a convolution may be subjected to a max pooling function, wherein the set of output channels may be reduced through filtration, keeping the largest concentrations of data within an output channel. Smaller concentrations of data may be filtered through the max pooling function, and the largest concentrations of data (for instance, parts of an image within a dataset with the greatest number of pixels) may be retained. The smaller concentrations of data may be eliminated through the max pooling function. The distinction between largest and smallest data within a channel may be relative to the output channels on which the max pooling function may be performed. The largest amount of data within a channel may be dependent on a predetermined portion of the channel which may be retained. For instance, if only a quarter of a channel may be retained in a max pooling of a channel, then a quarter of the channel with the largest amount of data or the largest number of pixels may be retained while the rest of the channel is eliminated.

Determination of a folding type for a compressed dataset 401 may begin with a first convolution operation performed on the compressed dataset creating a first set of output channels 403. The first set of output channels 403 may comprise a predetermined number of channels, which may then be able to undergo a first max pooling operation and creating a first set of max pooled output channels 405. The first set of max pooled output channels 405 may comprise the same number of channels as the first set of output channels 403. For instance, a compressed dataset 401 may comprise an image file. The compressed dataset may have a first convolution applied, creating a predetermined number of channels within a first set of output channels followed by a first max pooling operation. The first set of max pooled output channels 405 may further comprise the same number of channels as the first set of output channels.

After the first application of a convolution and max pooling function, the first set of max pooled output channels 405 may have a second convolution applied creating a second set of output channels 407. The second set of output channels 407 may comprise a predetermined number of channels equal to the number of channels comprised within the first set of max pooled output channels. The second set of output channels 407 may have a second max pooling function applied to create a second set of max pooled output channels 409. In some embodiments, the compressed dataset may be subjected to a plurality of rounds wherein a convolution operation is applied followed by a max pooling function. The second set of max pooled output channels 409 may be flattened or converted into a one-dimensional array and a rectified linear unit (ReLU) activation function 411 may be applied.

An ReLU activation function 411 may be applied to the second set of max pooled output channels 409, wherein the second set of max pooled out channels 409 may be assessed on the effectiveness of a fold type 415 applied to the particular compressed dataset 401. The ReLU activation function 411 may use a piecewise or non-linear function that may return either a zero or a positive value, which may be referred to as a folding compatibility output. The folding compatibility output may be an assessment of the effectiveness of a fold type on a compressed dataset 401. For instance, the ReLU activation function 411 may be used to assess factors that would determine the folding type used on a compressed dataset 401. The assessed factors may include the amount of data storage space that may be occupied by a post folded compressed dataset after a hypothetical fold type 415, the time in which the fold type would be conducted, measurements on the efficiency of the fold type, or other factors that may be preselected to determine a fold type. The folding compatibility output resulting from the applied ReLU activation function 411 may have a soft max function 413 applied to use the ReLU activation function results to determine a fold type 415.

The soft max function 413 may be used to determine the fold type 415 using the folding compatibility output of the ReLU activation function 411. The assessment of the folding compatibility output may be used within the soft max function 413 to determine a folding type from a group of folding types. For instance, the soft max function may be applied to analyze the folding compatibility output to determine that the fold type 415 should be a map fold to fold the compressed dataset 401. The selection of the map fold may be determined from application of the soft max function 413 on the folding compatibility output.

FIG. 5 illustrates an exemplary retrieval of a compressed dataset 304 from a folded and compressed dataset 310, as seen in FIG. 3. The compressed dataset 304 may be retrieved or recreated from the folded and compressed dataset 310 with the dynamic hash table 313, the associated key value data pair 317, and the fold type. The presence of each component contributes to the recreation or retrieval of the compressed dataset 304 from the folded and compressed dataset 310. The presence of an incorrect component may result in a corrupted or unworkable compressed dataset.

The dynamic hash table 313 and the associated key value data pair 317 may be used in a formula used to retrieve or recreate the compressed dataset 304. The key value data pair 317 may be used as an entry into the formula to recreate the compressed dataset 304. Use of an incorrect or erroneous key value data pair 317 may result in the corrupted or unworkable compressed dataset recreation. The key value data pair 317 may further comprise information relating to the fold type used to fold the folded and compressed dataset.

The fold type may be used by the inverse folder 325 to perform the inverse function of the AIFE 311. The inverse folder 325 may be used in conjunction with the dynamic hash table 313 and the associated key value data pair 317 to unfold the folded and compressed dataset 310 and retrieve or recreate the compressed dataset 304. The dynamic hash table 313 and the associated key value data pair 317 may have information associated with the fold type to be used by the inverse folder 325. In some embodiments, the fold type used initially by the AIFE 311 may be transmitted to the inverse folder 325 upon folding by the AIFE or by determination of the fold type from the RDC 309.

FIG. 6 illustrates a process flow for encryption through quantum computing utilizing linear compression. In some embodiments, a system (e.g., similar to one or more of the systems described herein with respect to FIGS. 1A-1C, 2, and 3) may perform one or more of the steps of process flow 600. For example, the encrypter 319 component within the compression, folding, and encryption architecture 300 may perform the steps of process flow 600.

In some embodiments, the process flow 600 may be an extension of the process flow 200. Particularly as seen in Block 212, encrypting the folded and compressed dataset and the dynamic hash table with the associated key value data pair through quantum computing utilizing linear compression, may be followed by the processes described herein with respect to process flow 600.

As shown in Block 602, a post folded set of redundant data may be eliminated via structural redundant elimination from the folded and compressed dataset, the dynamic hash table, and the key value pair. Structural redundant elimination may be utilized as previously described, wherein repetitive, unnecessary, and/or irrelevant data that may not compromise the structural integrity of the folded and compressed dataset, the dynamic hash table, or the key value pair may be removed or eliminated. Processing through structural redundant elimination may enable the folded and compressed dataset as well as the dynamic hash table and key value data pair to be converted into a quantum state representation.

As shown in Block 604, the folded and compressed dataset, the dynamic hash table, and the key value data pair—after undergoing structural redundant elimination—may be converted into a quantum state representation. The quantum state representation may include the use of qubits when converted into the quantum representation. Qubits may be a basic unit of information used in quantum computing that may exist in a two-state system and exist in both states simultaneously. Qubits may further exist in a probability, or superposition of both zero and one until measured or observed. Conversion of the folded and compressed dataset and the key value pair into the quantum state may reveal discardable qubits after structural redundant elimination. Discardable qubits may be removed from the quantum state representation without alteration of previously performed operations. The discardable qubits may then be used as an ancilla in predetermined algebraic operations intended to enhance encryption and compression. For example, the algebraic operations may utilize a linear summation in which portions of the discarded qubits may be added together (for instance, y=Ax+Bz+Cm). The quantum representation may enable the use of linear compression to further compress and encrypt the folded and compressed dataset and key value data pair.

As shown in Block 606, the quantum state representation may be encrypted using linear similarities found within the quantum state representation. Linear similarities may enable the reduction and/or compression of the quantum state representation through linear regression. Linear regression may enable the quantum state representation to be scaled down to encrypt and/or compress the contents within.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for dynamic folding and compression of data using quantum computing, the system comprising:
   a memory device with computer-readable program code stored thereon;
   at least one processing device operatively coupled to the at least one memory device and the at least one communication device, wherein executing the computer-readable code is configured to cause the at least one processing device to perform the following operations:
      determine a list of similarities through a comparison between a dataset and a historical record associated with previous datasets,
         wherein determination of the list of similarities of the dataset comprises assessing the dataset for similarities to the historical record and mapping the dataset to a process map table;
      recreate, in response to the list of similarities of the dataset, the dataset through the process map table;
      compress the dataset based on similarities found in the historical record;
      determine a folding type for folding of the compressed dataset;
      fold the compressed dataset using the determined folding type,
         wherein folding the compressed dataset comprises creating a dynamic hash table with a key value data pair associated with the folded and compressed dataset; and
      encrypt the folded and compressed dataset, the dynamic hash table, and the key value data pair through quantum computing utilizing linear compression.

2. The system of claim 1, wherein the determination of the folding type for compression causes the at least one processing device to perform the following operations:
   apply a first convolution on the compressed dataset to create a first set of output channels;
   apply a max pooling function on the first set of output channels to create a first set of max pooled output channels;
   apply a second convolution on the first set of max pooled output channels to create a second set of output channels;
   apply a second max pooling function on the second set of output channels to create a second set of max pooled output channels;
   apply a rectified linear unit (ReLU) activation function on the second set of max pooled output channels to create a folding compatibility output; and
   apply a soft max function on the folding compatibility output to determine the folding type for the compressed dataset.

3. The system of claim 2, wherein the application of the max pooling function comprises reduction of dimensionality of an input through filtration of the input to collect a determined largest amount of data within a channel.

4. The system of claim 1, wherein determination of the list of similarities of the dataset further comprises generative pre-trained transformer framework to assess the historical record for corpora that can be compressed through the process map table.

5. The system of claim 1, wherein recreation of the dataset through the process map table further comprises clustering the dataset and performing a lexical analysis.

6. The system of claim 1, wherein encryption of the folded and compressed dataset and the key value data pair through quantum computing utilizing linear compression causes the at least one processing device to perform the following operations:
   eliminate, via a structural redundant elimination, a post folded set of redundant data from the folded and compressed dataset, the dynamic hash table, and the key value data pair;
   convert the folded and compressed dataset, the dynamic hash table, and the key value data pair into a quantum state representation; and
   encrypt the quantum state representation using linear similarities found within the quantum state representation.

7. The system of claim 6, wherein the encrypted quantum state representation is transmitted to a predetermined destination.

8. The system of claim 6, wherein an inverse encryption function, an unfolding, and a decompression of the encrypted quantum state representation causes the at least one processing device to perform the following operations:
   crack the encrypted quantum state representation encryption using the inverse encryption function on the encrypted quantum state representation;
   obtain the folded and compressed dataset, the dynamic hash table, and the key value data pair from the cracked encrypted quantum state representation;
   unfold the folded and compressed dataset using the dynamic hash table and the key value data pair;
   obtain the compressed dataset from the unfolding of the folded and compressed dataset;
   decompress the compressed dataset; and
   obtain the dataset through the decompression of the compressed dataset.

9. A computer program product for dynamic folding and compression of data using quantum computing, wherein the computer program product comprises at least one non-transitory computer-readable program code portion embodied therein, the computer-readable program code portion which when executed by a processing device is configured to cause the processor to perform the following operations:
   determine a list of similarities through a comparison between a dataset and a historical record associated with previous datasets,
      wherein determination of the list of similarities of the dataset comprises assessing the dataset for similarities to the historical record and mapping the dataset to a process map table;
   recreate, in response to the list of similarities of the dataset, the dataset through the process map table;
   compress the dataset based on similarities found in the historical record;
   determine a folding type for folding of the compressed dataset;
   fold the compressed dataset using the determined folding type, wherein folding the compressed dataset comprises creating a dynamic hash table with a key value data pair associated with the folded and compressed dataset; and encrypt the folded and compressed dataset, the dynamic hash table, and the key value data pair through quantum computing utilizing linear compression.

10. The computer program product of claim 9, wherein in the determination of the folding type for compression, the processing device is further configured to cause the processor to perform the following operations:

apply a first convolution on the compressed dataset to create a first set of output channels;

apply a max pooling function on the first set of output channels to create a first set of max pooled output channels;

apply a second convolution on the first set of max pooled output channel to create a second set of max pooled output channels;

apply a second max pooling function on the second set of output channels to create a second set of max pooled output channels;

apply a rectified linear unit (ReLU) activation function on the second set of max pooled output channels to create a folding compatibility output; and apply a soft max function on the folding compatibility output to determine the folding type for the compressed dataset.

11. The computer program product of claim 10, wherein the application of the max pooling function comprises reduction of dimensionality of an input through filtration of the input to collect a determined largest amount of data within a channel.

12. The computer program product of claim 9, wherein determination of the list of similarities of the dataset further comprises generative pre-trained transformer framework to assess the historical record for corpora that can be compressed through the process map table.

13. The computer program product of claim 9, wherein recreation of the dataset through the process map table further comprises clustering the dataset and performing a lexical analysis.

14. The computer program product of claim 9, wherein encryption of the folded and compressed dataset and the encrypted key value data pair through quantum computing utilizing linear compression causes the processing device to further be configured to cause the processor to perform the following operations:

eliminate, via a structural redundant elimination, a post folded set of redundant data from the folded and compressed dataset, the dynamic hash table, and the key value data pair;

convert the folded and compressed dataset, the dynamic hash table, and the encrypted key value data pair into a quantum state representation; and encrypt the quantum state representation using linear similarities found within the quantum state representation.

15. The computer program product of claim 14, wherein an inverse encryption function, an unfolding, and a decompression the encrypted quantum state representation causes the processing device to further be configured to cause the processor to perform the following operations:

crack the encrypted quantum state representation encryption using the inverse encryption function on the encrypted quantum state representation;

obtain the folded and compressed dataset, the dynamic hash table, and the key value data pair from the cracked encrypted quantum state representation;

unfold the folded and compressed dataset using the dynamic hash table and the key value data pair;

obtain the compressed dataset from the unfolding of the folded and compressed dataset;

decompress the compressed dataset; and obtain the dataset through the decompression of the compressed dataset.

16. A computer-implemented method for dynamic data folding and compression of data using quantum computing, the computer-implemented method comprising:

determining a list of similarities through a comparison between a dataset and a historical record associated with previous datasets;

wherein determining the list of similarities of the dataset comprises assessing the dataset for similarities to the historical record and mapping the dataset to a process map table;

recreating, in response to the list of similarities of the dataset, the dataset through the process map table;

compressing the dataset based on similarities found in the historical record;

determining a folding type for folding of the compressed dataset; and folding the compressed dataset using the determined folding type, wherein folding the compressed dataset comprises creating a dynamic hash table with a key value data pair associated with the folded and compressed dataset; and encrypting the folded and compressed dataset, the dynamic hash table, and the key value data pair through quantum computing utilizing linear compression.

17. The computer-implemented method of claim 16, wherein the determination of the folding type for compression further comprises:

applying a first convolution on the compressed dataset to create a first set of output channels;

applying a max pooling function on the first set of output channels to create a first set of max pooled output channels;

applying a second convolution on the first set of max pooled output channels to create a second set of output channels;

applying a second max pooling function on the second set of output channels to create a second set of max pooled output channels;

applying a rectified linear unit (ReLU) activation function on the second set of max pooled output channels to create a folding compatibility output; and applying a soft max function on the folding compatibility output to determine the folding type for the dataset.

18. The method of claim 17, wherein the application of the max pooling function comprises reduction of dimensionality of an input through filtration of the input to collect a determined largest amount of data within a channel and eliminate smaller data within the channel.

19. The method of claim 16, wherein encryption of the folded and compressed dataset, the dynamic hash table, and the key value data pair through quantum computing utilizing linear compression further comprises:

eliminating, via a structural redundant elimination, a post folded set of redundant data from the folded and compressed dataset, the dynamic hash table, and the key value data pair;

converting the folded and compressed dataset, the dynamic hash table, and the encrypted key value data pair into a quantum state representation; and encrypting the quantum state representation using linear similarities found within the quantum state representation.

20. The method of claim 19, wherein an inverse encryption function, an unfolding, and a decompression of the encrypted quantum state representation comprises;

cracking the encrypted quantum state representation encryption using the inverse encryption function on the encrypted quantum state representation;

obtaining the folded and compressed dataset, dynamic hash table, and key value data pair from the cracked encrypted quantum state representation;

unfolding the folded and compressed dataset using the dynamic hash table, and the key value pair;

obtaining the compressed dataset from the unfolding of the folded and compressed dataset;

decompressing the compressed dataset; and obtain the dataset through the decompression of the compressed dataset.

\* \* \* \* \*